Oct. 25, 1927.

H. L. DOHERTY 1,646,641

STORAGE RESERVOIR

Filed July 18, 1921

Henry L. Doherty, Inventor

By His Attorney

Edmund G. Borden

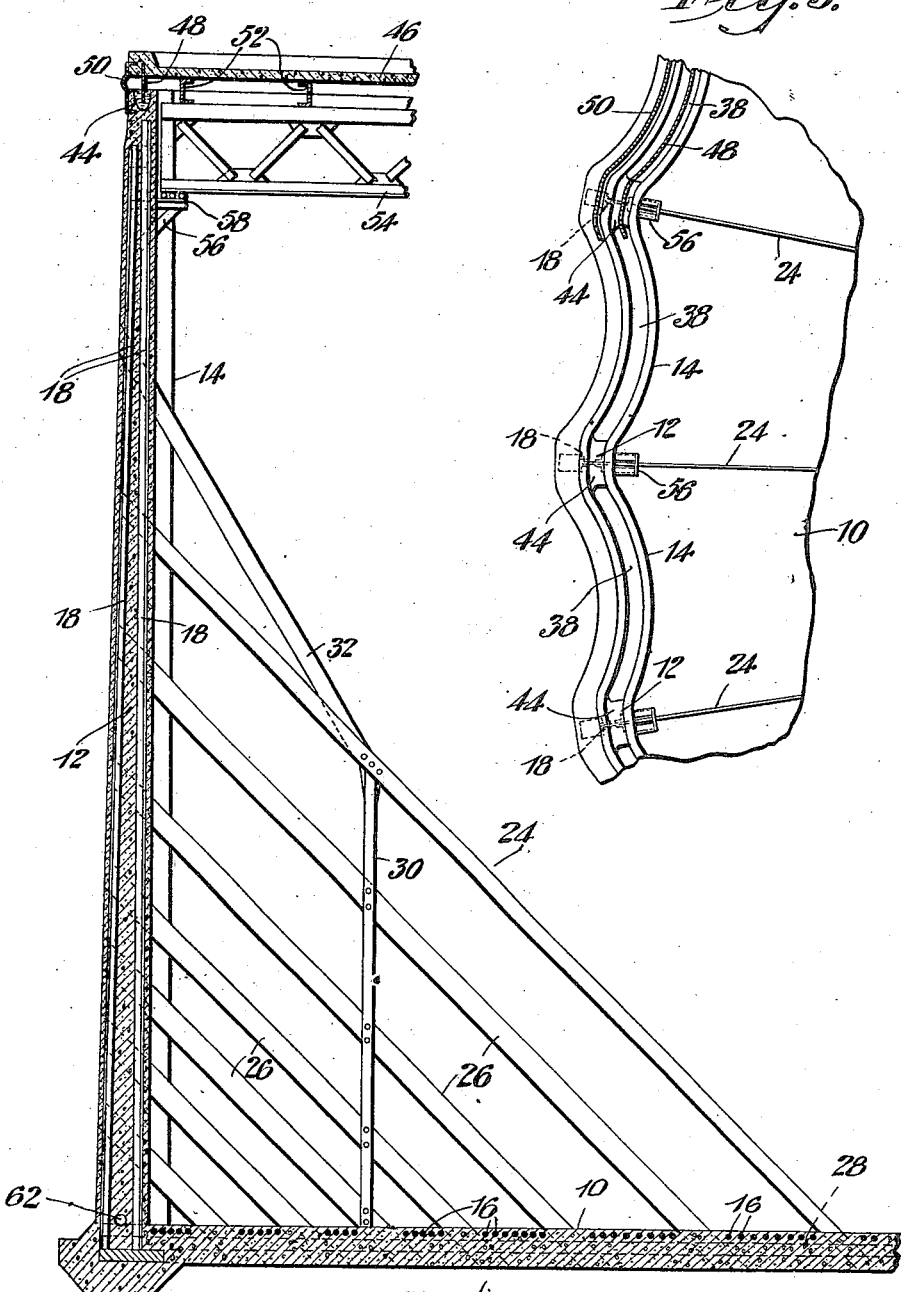

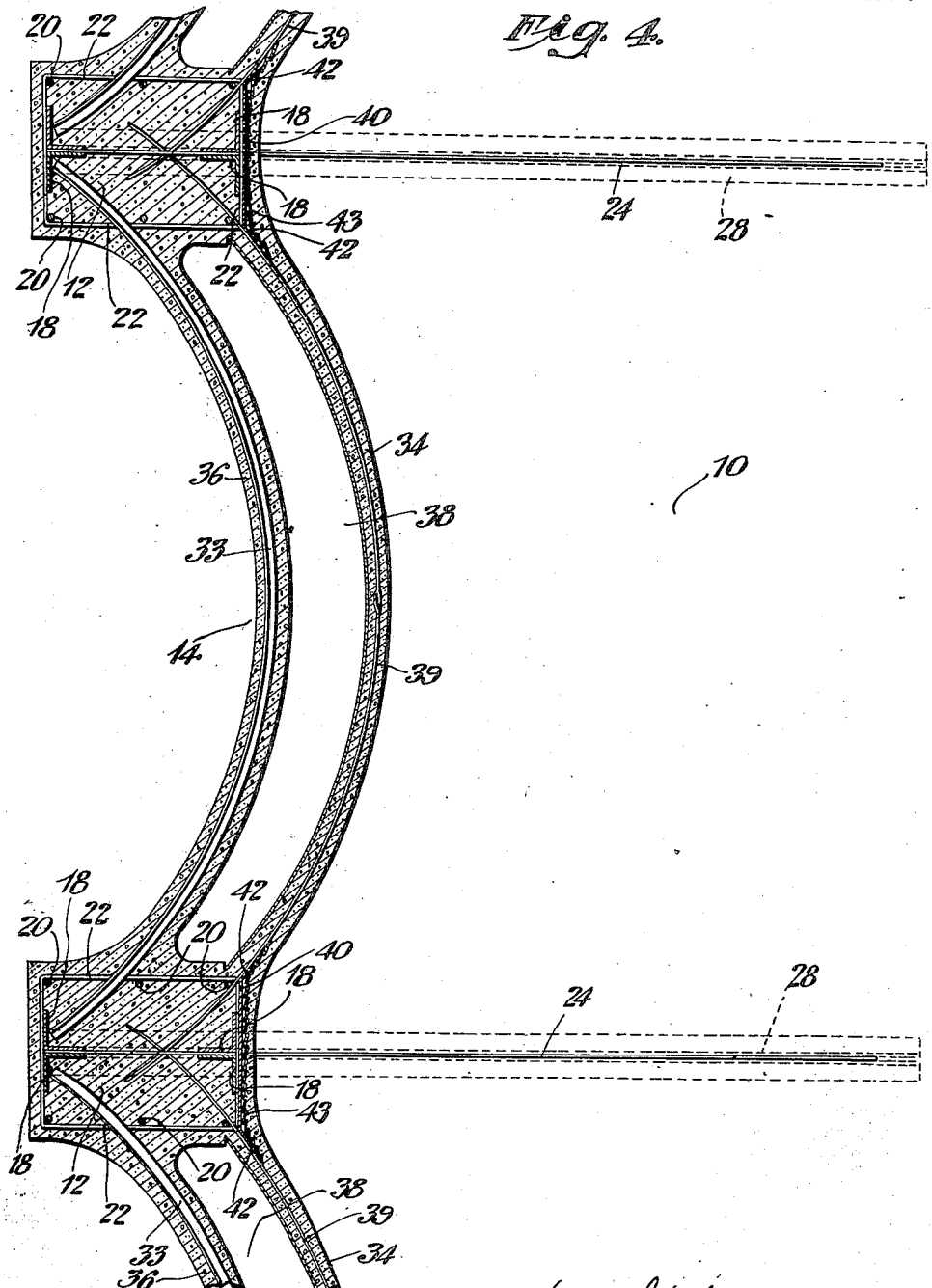

Patented Oct. 25, 1927.

1,646,641

UNITED STATES PATENT OFFICE.

HENRY L. DOHERTY, OF NEW YORK, N. Y., ASSIGNOR TO DOHERTY RESEARCH COMPANY, OF NEW YORK, N. Y., A CORPORATION OF DELAWARE.

STORAGE RESERVOIR.

Application filed July 18, 1921. Serial No. 485,406.

This invention relates to a storage reservoir and to methods of storing fluids. More particularly, the invention relates to an oil storage reservoir or tank of that type in which the walls extend for a substantial distance above the surface of the ground.

At the present time practically all crude petroleum in storage, is stored in circular steel tanks. The walls of these tanks are not provided with buttresses or trusses but the steel plates of the walls are gradually increased in thickness from the top to the bottom to withstand the strain caused by the outward pressure of the contents of the tank. This construction is very expensive and has limited the size of tanks which may be built.

One object of the invention is to enable oil to be stored in large quantities and at small expense.

Another object of the invention is to provide a storage reservoir of comparatively light concrete construction which is capable of holding much larger quantities of fluids than the usual steel tanks.

A further object of the invention is to provide a storage tank which will prevent loss due to leakage and seepage.

In the performance of these objects, important features of the invention reside in the construction of the wall of the reservoir and of the means for supporting the wall. The nature of these features is such as to enable the reservoir to be built from a comparatively small amount of material and to be composed of elements which may be readily fabricated and incorporated in the completed structure in a manner such as to afford a liberal factor of safety. In accordance with one of the above features, the columns which sustain the major portion of the outward pressure of the contents of the reservoir are connected to the floor of the reservoir by suitable means joined to the columns and the floor over relatively large areas and acting to transmit the pressure on the columns to the floor, where it is opposed by the pressure of the contents of the reservoir on the floor, the frictional resistance of the floor to sliding movement, and the shear of the portions of the floor below the ground line.

Another important feature of the invention consists in collecting a fluid such, for example, as oil in a reservoir having hollow walls and maintaining fluid in the cavities of the walls at a pressure in any given horizontal plane greater than the pressure of the fluid in the reservoir so that in case of the passage of fluid through the walls of the reservoir, the flow will be from the fluid in the cavities to the fluid in the reservoir rather than from the stored fluid outwardly through the walls.

A still further feature of the invention resides in the provision in a storage reservoir of a series of columns between which are arched each consisting of sections spaced from each other to provide a cavity between them. Preferably, and in the present example of the invention, the cavities in the arches extend to the top edge of the wall of the reservoir, and the upper ends of the columns are formed with troughs communicating at their ends with the cavities so as to provide a continuous line of fluid around the edge of the reservoir when the cavities are filled with liquid. The continuous line of liquid may be utilized in connection with a depending member on the roof of the reservoir to constitute a liquid seal which prevents the escape of gas or vapors from the reservoir.

Other objects and features of the invention will appear as the description proceeds and will be pointed out in the appended claims.

In the drawings which illustrate a preferred embodiment of the invention;

Fig. 2 is a view in sectional elevation taken along the line 2—2 of Fig. 1;

Fig. 3 is a plan view on an enlarged scale of the wall of the reservoir with the roof removed; and Fig. 4 is a sectional plan view of two of the columns of the reservoir wall and the arch intervening between them.

Figure 1:
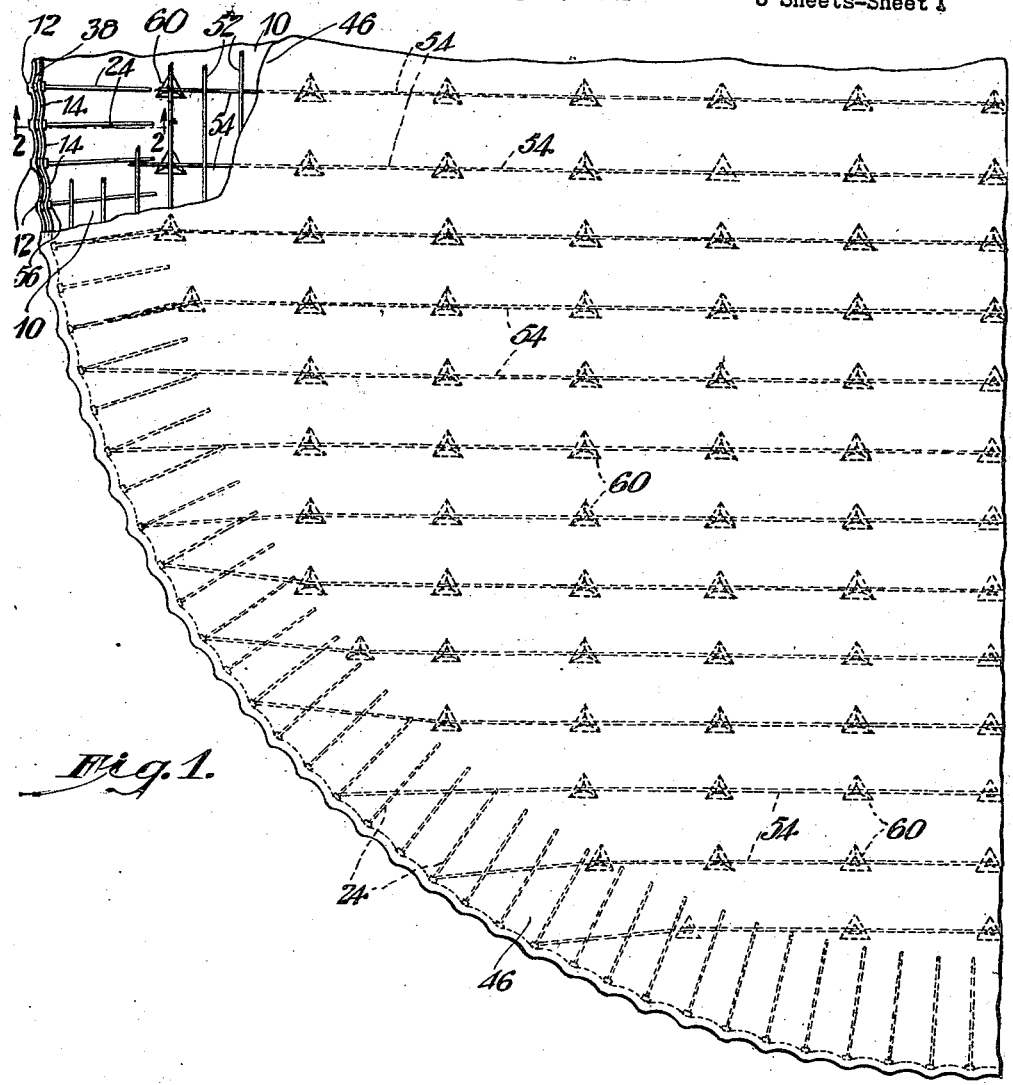
Fig. 1 is a plan view of a quadrant of the storage reservoir.

In the illustrated construction, the reservoir consists of a floor 10 and a generally circular retaining wall comprising columns 12 and intervening arches 14 (Fig. 4). The floor 10 is preferably constructed of concrete reinforced in the portion adjacent to the wall by rods 16 (Fig. 2), and the columns 12 are of the composite type consisting of concrete and structural steel. As shown, the steel uprights of the columns 12 are in the form of angle bars arranged in two pairs, each pair comprising two uprights having one side of each upright disposed parallel to and spaced from the adjacent side of the other upright and the other sides of the uprights extending in opposite directions and in a straight line. The angle bars 18 are embedded at their lower ends in the concrete slab constituting the floor 10 so as to provide a firm base for the columns. The columns 12 are further strengthened by upright rods 20 around which are bent horizontal rods 22.

The present construction is particularly adapted for reservoirs of large size (a capacity of one million barrels). The pressure encountered in such structures requires that the side walls be permitted to flex and the large size requires provision for extensive expansion and contraction. In order to enable the retaining wall of the reservoir to be constructed of a comparatively small amount of material and to allow, nevertheless, for a liberal factor of safety, the pressure of the contents of the reservoir on the wall is transmitted to the floor 10 either inwardly or outwardly of the wall. The transmission of the pressure from the wall to the floor 10 is effected by means of connections between the columns 12 and the floor 10, and the connections are preferably located inwardly of the retaining wall so that outward movement of the columns is caused to be opposed by the pressure of the contents of the reservoir on the floor 10, as well as by the frictional resistance of the floor to sliding movement on the earth structure, and by the shear of the portions of the floor which extend below the ground line. The ground line will preferably be arranged substantially as indicated at the left of Fig. 2, and the "shear" of the floor denotes the force necessary to displace the earth lying in the horizontal plane of the edge of the floor and of the downward projections on the floor. By utilizing the above-mentioned forces and relieving the bases of the columns 12 from practically all outward thrust, it is evident that the retaining wall may be supported more securely and with much less material than would be required if the pressure on the wall was transmitted to the bases of the columns.

As shown, the columns 12 are connected to the floor 10 adjacent to the wall of the reservoir by trusses 24, each comprising tension rods or braces 26 having their lower ends riveted to angle bars 28 forming part of a composite beam incorporated in the floor 10 and having their upper ends received between the members of the pairs of steel uprights 18 and riveted to the uprights. In the event that a tank is formed with straight walls, the trusses 24 extend inwardly at right angles to the walls. In case the tank is formed with curved walls the trusses 24 are arranged substantially at right angles to the tangent of the curve. Inasmuch as the illustrated tank is circular in form, the trusses 24 extend inwards from the wall substantially radially. The tension rods 26 are of increasing length in order of their remoteness from the base of the column 12. Preferably, and as shown, the ends of each of the rods 26 are secured to the columns 12 and the beam in the floor 10 at substantially equal distances from the point of intersection of the columns and the floor. A considerable number of tension rods 26 is preferably employed, and the points of connection of the tension rods with the columns 12 and the floor 10 are distributed over relatively large areas so that the rods may be secured at their ends with sufficient strength to enable them to sustain the entire thrust on the columns caused by the pressure of the contents of the reservoir.

The tension rods 26 are so constructed and arranged as to cause the pressure on the columns 12 to be distributed among them substantially in accordance with their cross-sectional areas. As shown, the shorter rods are spaced from each other by substantially equal distances. Consequently, the cross-sectional areas of the rods are gradually decreased in the order of their remoteness from the bases of the columns, in order to compensate for the decrease in pressure toward the tops of the columns. The longer tension rods 26 are caused to bear only their proportional share of the pressure on the columns both by making them of decreasing cross-sectional area as they approach the tops of the columns and also by spacing their ends at successively greater distances apart. The effect of this construction is to cause each of the rods 26 to oppose its proper share of resistance to outward movement of the columns at all pressures, and to prevent varying stresses at different points in the columns.

Inasmuch as the pressure on the columns 12 is transmitted to the tension rods 26 in proportion to their cross-sectional areas, the rods 26 when subjected to pressure will be elongated in proportion to their length. Moreover, since the rods are of increasing length in accordance as they approach the tops of the columns, the rods nearest the tops of the columns will be elongated to a greater extent than those adjacent to the bases of the columns. Consequently, when the reservoir is full of oil and the pressure on the columns is large, the upper portions of the columns will be flexed outwardly. The flexure of the columns 12 is not of large extent, but it is very important that they be capable of being flexed. It is evident that the tension rods 26 will tend to elongate when the pressure on the columns 12 rises above a certain degree. If the columns 12 were restrained against flexure the outward pressure in addition to the pressure required to elongate the rods would necessarily be transmitted through the columns to the bases of the columns where it could be opposed with a proper factor of safety only at much greater cost and by the use of much more material than is required when the force is transmitted to the floor 10 by the tension rods. In case of flexure of the columns 12, the arches 14 will flex slightly to accommodate themselves to movement of the columns.

The floor 10 of the reservoir should be laid on a foundation which will provide good drainage. This is necessary in order to prevent the development of liquid pressure beneath the floor 10 by reason of seepage through it. The development of pressure beneath the floor 10 would neutralize the pressure of the oil on the bottom of the reservoir and thereby weaken the forces tending to support the retaining wall.

A vertical rod 30 is riveted to the tension rods 26 of each of the trusses and is in turn connected to the column 12 above the tension rods 26 by a stay rod 32. The pairs of steel uprights 18 in the column 12 are connected between the upper tension rod 26 and the stay rod 32 and above the stay rod 32 with lattice bars of usual character. The construction hereinbefore described provides a safe support for the walls of the tank not only against the pressure of the contents of the tank but also against all external forces such, for example, as wind pressure.

When oil is stored in concrete reservoirs there is usually more or less seepage through the walls of the reservoir. This is objectionable not only because it results in the loss of oil, but also because it is very difficult to make permanent repairs to concrete walls impregnated with oil. In order to avoid this objection the arches 14 are preferably made in the form of an inner section 34 and an outer section 36 spaced apart to provide a cavity 38 between them. The cavities 38 are adapted to contain a suitable liquid, for example, water. The water is maintained in the cavities 38 at a level such as to cause the pressure of the water in any given horizontal plane to be greater than the pressure of the oil in the reservoir so that in case of the passage of liquid through the walls of the reservoir, the flow is from the water in the cavities 38 to the oil in the reservoir rather than from the oil outwardly through the walls of the reservoir.

Inasmuch as the pressure of the water in the cavities 38 is greater than the pressure on the oil, the inner sections 34 of the arches 14 are of the nature of tension arches. As shown, the sections 34 are reinforced by curved rods 39 joined at the center of the arch and having their outer ends embedded in the columns 12. In order to cause them to be anchored securely, the rods 39 belonging to the arches on opposite sides of a column 12 have their outer ends crossed in the column as shown in Fig. 4. The outer sections 36 of the arches 14 will be under compression and are specially constructed for this purpose. As shown, the sections 36 are reinforced with expanded metal strips 33 having their edges superimposed on each other and having their ends embedded in the columns 12 and abutting against the inner sides of the front flanges of the front pair of steel uprights 18. The form of reinforcing material employed in the illustrated construction is of the type known to the trade as "high-rib". It is manifest, however, that various kinds of reinforcing material may be used within the scope of the invention.

Seepage of oil through the wall of the reservoir between the arches 14 is prevented by steel plates 40 mounted on the inner sides of the columns 12 and provided with flanges 42 arranged to overlap the points of intersection of the inner sections 34 of the arches with the columns. The concrete portion of the columns 12 is preferably extended inwardly of the plates 40 and is reinforced by strips 43 of expanded metal.

The cavities 38 of the arches 14 are preferably extended to the tops of the arches, and the columns 12 are provided at their tops with troughs 44 having their ends communicating at each side of the columns with the cavities 38 so as to form a continuous line of liquid about the top edge of the wall of the reservoir. In order to form a liquid seal to prevent the escape of vapors from the oil in the reservoir, the roof 46 is provided near its edge with a sheet metal strip 48 having its upper end embedded in the roof 46 and its lower edge adapted to enter the liquid in the cavities 38 and troughs 44. The space between the roof 46 and the upper edge of the wall of the reservoir may be further sealed by a second flexible metal strip 50 having a bead in its mid-portion and its upper and lower edges inturned and embedded in grooves in the roof 46 and the wall of the reservoir respectively. The metal strips 48 and 50 allow relative movement between the roof 46 and the reservoir in case of varying contraction or expansion due to heat changes. The strip 50 may be dispensed with so long as the liquid seal is operating normally, but it would be useful, for example, if in winter time the water in the cavities 38 should be frozen, or if for any other reason the liquid seal should be rendered inoperative.

The roof 46 is supported on purlins 52 disposed transversely on roof trusses 54 arranged in parallel in the reservoir. As shown in Fig. 2, the roof trusses 54 have their ends mounted on brackets 56 extending inwardly from the tops of the columns 12. Expansion joints 58 are preferably provided between the ends of the roof trusses 54 and the brackets 56 so as to allow for varying contraction or expansion of the roof trusses and the reservoir. The roof trusses 54 are supported at their central portions (Fig. 1) on windmill towers 60 of usual construction. The towers 60 are located at uniform distances along the bottom of the reservoir.

The provision of the cavities 38 and the maintenance of water in them serves also to prevent the conductance of heat to the oil and to absorb heat from the oil, thereby reducing vaporization. If desired the water may be caused to circulate in the cavities 38 in order more effectively to cool the oil. In order to enable such circulation to be effected and to allow the cavities to be drained through a single conduit, they are preferably connected near their bottoms by openings 62 (Fig. 2) formed in the bases of the columns 12.

It should also be noted that the provision of water in the cavities 38 will cause sufficient water to enter the oil to compensate for seepage through the floor 10. Since water is heavier than most kinds of oil, the water which enters the oil sinks to the bottom of the reservoir. Consequently, seepage through the bottom of the reservoir consists mainly of water.

Although the arches 14 have been described as being made in two sections to provide hollow spaces in the retaining wall, it is recognized that certain features of the invention, including the improved manner of supporting the columns 12 and arches 14, may be embodied in a reservoir having arches made in single sections only. Moreover, the above and other features of the invention may also be embodied in tanks constructed of steel or other material rather than of concrete. Accordingly, it is intended that the scope of the invention shall not be restricted except as required by the appended claims.

Having fully described the invention what is claimed is:

1. In a storage reservoir, a structural floor, a series of upright columns anchored in the floor, a plurality of braces subtending the angle between and connected to the floor and the individual columns, said braces being of progressively decreasing cross-sectional area as the length of the braces increases, whereby the column so braced may tilt on its foot as a pivot under the pressure of the contents of the reservoir.

2. In a storage reservoir of generally circular form, a floor, a series of columns extending upwardly from the floor, arches intervening between and connected at their ends to the columns, and means for supporting the columns comprising trusses extending inwardly from the columns substantially at right angles to the horizontal line of the columns and arches and connecting the columns with the floor of the reservoir, said columns, trusses, floor and arches constituting the sole support against the lateral pressure of liquid in the reservoir.

3. In a storage reservoir, a floor, a series of upright columns, means for supporting the columns against pressure of the contents of the reservoir, said means comprising inwardly extending trusses having tension devices connected between the floor and the columns, said devices being spaced to permit the upper portions of the columns to flex outwardly under restraint of the trusses, arches intervening between and united for movement with the columns, a roof supported upon said columns, and means intermediate said roof and said columns for permitting a flexing movement of the columns and arches relatively of said roof.

4. In a storage reservoir, a floor, a wall comprising a series of columns extending upwardly from the floor and arches intervening between the columns, trusses having rods connected between the columns and the floor for transmitting the pressure of the contents of the reservoir on the walls to the reservoir floor, said truss rods decreasing in cross sectional area and being spaced farther apart in accordance with their remoteness from the base of the columns to permit the upper portion of the wall to flex outwardly, a roof supported on said walls, means intermediate said roof and said walls permitting a relative flexing movement between the roof and wall, and a gas tight seal between the roof and wall.

5. In a storage reservoir, a floor, a series of columns extending upwardly from the floor, arches intervening between the column and connected at their ends to the columns, and means for connecting the columns to the floor, said means being joined to both the floor and the columns over a relatively large area so as to cause the pressure of the contents of the reservoir on the columns and arches to be transmitted to the floor, where it is opposed by the pressure of the contents of the reservoir downwardly and by the frictional resistance of the floor to sliding movement on the earth structure or by the frictional resistance between the floor and earth structure augmented by the shear between the portions of the floor below the ground line and the earth structure.

6. In a storage reservoir of generally circular form, a concrete floor, a series of columns extending upwardly from the floor, arches intervening between the columns and connected at their ends to the columns, and means for supporting the columns and arches against the pressure of the contents of the reservoir, said means comprising a truss extending radially inwardly from each of the columns and made up of a composite beam incorporated in the floor of the reservoir, and a number of tension rods arranged in a vertical plane and connected to the beam and column at gradually increasing distances from the base of the column.

7. In a storage reservoir, a concrete floor, a series of re-inforced concrete columns extending upwardly from the floor, trusses for supporting the columns against the pressure of the contents of the reservoir, said trusses extending inwardly and including rods connected to the columns and the floor and of increasing length in the order of their remoteness from the base of the column so that the column may flex outwardly at its upper end to a greater extent than at its lower end, and arches intervening between the columns and adapted to accommodate themselves to the flexure of the columns.

8. In a storage reservoir, a floor, a continuous wall comprising a series of columns extending upwardly from the floor and arches intervening between the columns, and means for transmitting the pressure of the contents of the reservoir on the wall to the floor of the reservoir at points within and adjacent to the wall comprising a tension truss connecting each column to the floor, said trusses extending inwardly from the columns a comparatively long distance so that the pressure is opposed by the resistance of the floor to sliding movement.

9. In a storage reservoir, a floor, a series of columns of built up construction capable of bending outwardly in response to pressure, arches intervening between the columns and connected at their ends to the columns, and trusses for supporting the columns against the pressure of the contents of the reservoir, said trusses being composed of tension bars connected diagonally between the floor and the columns, the spacing of the bars from the bottom of the columns being such as to cause the pressure on the columns to be distributed between them substantially in proportion to their cross-sectional areas when the columns are flexed outwardly.

10. In a storage reservoir, a floor, a series of columns, extending upwardly from the floor, arches connected at their ends to the columns and each consisting of sections spaced from each other to provide a cavity between them, and means connecting said columns to said floor, said means acting in tension.

11. In a storage reservoir, a floor, a series of columns extending upwardly from the floor, internally convex arches connected at their ends to the columns and each consisting of an outer compression arch and an inner tension arch spaced from each other to provide a cavity adapted to contain liquid at a greater pressure in any given horizontal plane than the pressure of the contents of the reservoir, and means acting normally in tension and connecting said columns to said floor.

12. In a storage reservoir, a floor, a series of columns extending upwardly from the floor, internally convex tension arches intervening between the columns, means providing a cavity adapted to contain liquid imposing a pressure on the outer surfaces of said arches greater in any given horizontal plane than that of the contents of the reservoir on their inner surfaces, and means connecting said columns to said floor and acting normally in tension.

13. In an oil storage reservoir, a floor, a series of reinforced concrete columns extending upwardly from the floor, a pair of arches intervening between adjacent columns spaced apart to provide a cavity between them, a liquid in the cavities having a level higher than that of the oil in the reservoir to prevent seepage of oil through the arches, and means associated with the columns for preventing seepage of oil through the wall of the reservoir at points adjacent to the columns.

14. In an oil storage reservoir, a floor, a series of reinforced concrete columns extending upwardly from the floor, a series of arches intervening between the columns spaced apart to provide cavities between them, a liquid in the cavities maintained at a level higher than that of the oil in the reservoir to prevent seepage of oil through the arches, and an upwardly extending imperforate plate located in the inner portion of each column and serving to prevent seepage of oil through the wall of the reservoir at points adjacent to the columns.

15. In a storage reservoir, a series of columns, walls intervening between the columns, brackets extending inwardly from the columns adjacent to their upper ends, roof trusses having their ends mounted on the brackets, expansion joints between the roof trusses and the brackets, and a roof supported on the trusses.

16. In a storage reservoir, a series of columns, walls intervening between the columns, brackets extending inwardly from the columns adjacent to their upper ends, roof trusses disposed below the upper edge of the wall of the reservoir and having their ends mounted on the brackets, towers for supporting the central portions of the roof trusses, purlins carried by the roof trusses and arranged transversely of the roof trusses, and a roof supported on the purlins.

17. In a storage reservoir, a series of columns, arches intervening between the columns and each consisting of sections spaced apart to provide a cavity in the arch, troughs formed in the upper ends of the columns and arranged in alinement with the cavities in the arches so as to form a continuous line of liquid about the top edge of the reservoir when the cavities are filled with liquid, a roof, and a member depending from the roof and adapted to enter the cavities in the arches and the troughs in the columns to provide a liquid seal for the roof.

18. In a storage reservoir, the combination with the reservoir wall, of a roof extending over said wall in spaced relation thereto, and means for maintaining a seal between the roof and the wall during expansion and contraction of the roof, said means comprising a metal strip secured to the roof and to the wall, the linear length of the strip asross the space between the roof and the wall being greater than the height of said space, whereby the strip will permit relative transverse movement between the roof and wall as well as relative vertical displacement therebetween.

19. In a storage reservoir, a structural floor, a series of upright columns anchored in the floor, re-enforcing means connected between the individual columns and the floor, said means comprising a structure which will permit the column to tilt about its foot as a pivot under the pressure of the contents of the reservoir.

In testimony whereof I affix my signature.

HENRY L. DOHERTY.